United States Patent
Hikmet et al.

(10) Patent No.: US 10,618,218 B2
(45) Date of Patent: Apr. 14, 2020

(54) METHOD FOR MANUFACTURING A 3D ITEM COMPRISING AN ELECTRONIC COMPONENT

(71) Applicant: SIGNIFY HOLDING B.V., Eindhoven (NL)

(72) Inventors: Rifat Ata Mustafa Hikmet, Eindhoven (NL); Ties Van Bommel, Eindhoven (NL)

(73) Assignee: SIGNIFY HOLDING B.V., High Tech Campus ( * ) Notice: Subject to any disclaimer, the term of this patent is extended or adjusted under 35 U.S.C. 154(b) by 0 days.

(21) Appl. No.: 16/302,710

(22) PCT Filed: May 30, 2017

(86) PCT No.: PCT/EP2017/062943
§ 371 (c)(1),
(2) Date: Nov. 19, 2018

(87) PCT Pub. No.: WO2017/207514
PCT Pub. Date: Dec. 7, 2017

(65) Prior Publication Data
US 2019/0118474 A1    Apr. 25, 2019

(30) Foreign Application Priority Data

Jun. 2, 2016    (EP) ..................... 16172557

(51) Int. Cl.
*B29C 64/314*    (2017.01)
*B33Y 10/00*    (2015.01)
(Continued)

(52) U.S. Cl.
CPC .......... *B29C 64/314* (2017.08); *B29C 64/118* (2017.08); *B29C 64/209* (2017.08); *B29C 70/70* (2013.01); *B29C 70/88* (2013.01); *B33Y 10/00* (2014.12); *B33Y 30/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS 9,126,365 B1 *  9/2015  Mark ..................... B29C 70/20
10,087,309 B2 * 10/2018  Mason .................... C08K 3/40
(Continued)

FOREIGN PATENT DOCUMENTS

WO    2015077262 A1    5/2015

*Primary Examiner* — Edmund H Lee
(74) *Attorney, Agent, or Firm* — Daniel J. Piotrowski

(57) ABSTRACT

A method for manufacturing a 3D item (10) comprising an electronic component (40), wherein the method comprises the step of printing with a fused deposition modeling (FDM) 3D printer (500) 3D printable material (201) to provide said 3D item (10), wherein the 3D printable material (201) comprises said electronic component (40). The fused deposition modeling (FDM) 3D printer comprises a printer nozzle, and the method further comprises the steps of providing upstream of the printer nozzle a filament of 3D printable material, wherein the filament comprises a cavity for hosting the electronic component, and creating upstream of the printer nozzle an assembly of the filament and the electronic component.

8 Claims, 9 Drawing Sheets

(51) Int. Cl.
*B29C 64/118* (2017.01)
*B33Y 70/00* (2020.01)
*B29C 70/88* (2006.01)
*B33Y 80/00* (2015.01)
*B29C 70/70* (2006.01)
*B33Y 30/00* (2015.01)
*B29C 64/209* (2017.01)

(56) References Cited

U.S. PATENT DOCUMENTS

| | | |
|---|---|---|
| 2009/0177309 A1 | 7/2009 | Kozlak |
| 2013/0089642 A1 | 4/2013 | Lipson et al. |
| 2013/0089643 A1 | 4/2013 | Chapman |
| 2014/0268604 A1 | 9/2014 | Wicker et al. |
| 2014/0328963 A1* | 11/2014 | Mark ................. B29C 70/20 425/143 |
| 2014/0361460 A1* | 12/2014 | Mark ................. B29C 70/521 264/248 |
| 2016/0198576 A1* | 7/2016 | Lewis ............... H01L 23/49822 361/761 |
| 2017/0334139 A1* | 11/2017 | Ammi ................. B29C 64/336 |
| 2018/0022023 A1* | 1/2018 | Therriault ............ C08J 3/075 264/460 |
| 2018/0141274 A1* | 5/2018 | Fink .................. B33Y 10/00 |

* cited by examiner

METHOD FOR MANUFACTURING A 3D ITEM COMPRISING AN ELECTRONIC COMPONENT

CROSS-REFERENCE TO PRIOR APPLICATIONS

This application is the U.S. National Phase application under 35 U.S.C. § 371 of International Application No. PCT/EP2017/062943, filed on May 30, 2017 which claims the benefit of European Patent Application No. 16172557.7, filed on Jun. 2, 2016. These applications are hereby incorporated by reference herein.

FIELD OF THE INVENTION

The invention relates to a method for manufacturing a 3D item.

BACKGROUND OF THE INVENTION 3D printing with inputs is known in the art. WO2015077262, for instance, describes 3D printer inputs including filaments comprising separated layers or sections. These inputs, particularly including filaments, may be prepared by coextrusion, microlayer coextrusion or multicomponent/fractal coextrusion. These inputs and specifically filaments enable layering or combining different materials simultaneously through one or more nozzles during the so-called 3D printing process. These techniques facilitate smaller layer sizes (milli, micro, and nano) different layer configurations as well as the potential to incorporate materials that would otherwise not be usable in standard 3D printer methods.

SUMMARY OF THE INVENTION

Within the next 10-20 years, digital fabrication will increasingly transform the nature of global manufacturing. One of the aspects of digital fabrication is 3D printing. Currently many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three dimensional object. FDM printers are relatively fast and can be used for printing complicated object.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded—high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc.

The term "3D printable material" may also refer to a combination of two or more materials. In general these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the one or more of the receiver item and 3D printable material deposited on the receiver item to a temperature of at least the glass transition temperature, especially to a temperature of at least the melting point. In yet another embodiment, the 3D printable material comprises a (thermoplastic) polymer having a melting point ($T_m$), and the printer head action comprises heating the one or more of the receiver item and 3D printable material deposited on the receiver item to a temperature of at least the melting point.

Specific examples of materials that can be used can e.g. be selected from the group consisting of acrylonitrile butadiene styrene (ABS), polylactic acid (PLA), polycarbonate (PC), polyamide (PA), polystyrene (PS), lignin, rubber, etc.

FDM printers are relatively fast, low cost and can be used for printing complicated 3D objects. Such printers are used in printing various shapes using various polymers. The technique is also being further developed in the production of LED luminaires and lighting solutions. However, for including electronic components conventional solutions may complicate the production process as the 3D printed object under construction may have to leave the printing stage to have included the electronic component. Further, for electrical connections, conductive polymers may be applied, but this seems to complicate the printing process, and may be relatively expensive when high conductivity is desired.

Hence, it is an aspect of the invention to provide an alternative 3D printing method, which preferably further at least partly obviates one or more of above-described drawbacks.

WO2015/077262 seems to describe a 3D printer nozzle or hot end which extrudes a 3D printer deflected output flow wherein said output comprise additional elements such as electronic, optical, magnetic, metallic, biologic, structural, durable, thermal, medical, photovoltaic or pharmaceutical. An electronic component may be defined as any basic discrete device or physical entity in an electronic system used to affect electrons or their associated fields. Especially, an electronic component has two or more electrical terminals (or leads) (aside from antennas which may only have one terminal).

Hence, herein it is proposed to use filaments for FDM printers containing discrete elements such as LEDs. It is herein suggested using a pre-configured filament with inclusions where the (objects such as) LEDs can be placed. In order to do this, the software which drives the printer to produce 3D objects can be used to generate instructions for configuring the filament to place the object at the desired position.

Hence, in a first aspect the invention provides a method for manufacturing a 3D item comprising an electronic component, such as a solid state light source, wherein the method comprises the step of (3D) printing with a fused deposition modeling (FDM) 3D printer (herein also indicated as "3D printer") 3D printable material to provide said 3D item, wherein the 3D printable material comprises said electronic component. The fused deposition modeling (FDM) 3D printer comprises a printer nozzle, and the method further comprises providing upstream of the printer nozzle a filament of 3D printable material, and creating upstream of the printer nozzle an assembly of the filament and the electronic component.

With such method, it is possible to print in one run both the filament and the electronic component. Though two (or more) printer heads may be used, it is not necessary to use two printer heads. Even more, it is not necessary to remove the 3D printed object under construction from the stage and/or introduce e.g. another robotic device for introduction of the electronics on the stage. Further, with the present method the electronic device can be fully embedded in the 3D printed object and may in embodiments also be oriented.

Hence, with the present invention based on (polymeric) filaments combined with one or more electronic components, such one or more electronic components together with the filament material is printed, i.e. provided as printable material and printed on a substrate or on already 3D printed layers on the substrate.

The electronic component may include an active or a passive electronic component. An active electronic component may be any type of circuit component with the ability to electrically control electron flow (electricity controlling electricity). Examples thereof are diodes, especially light emitting diodes (LED). LEDs are herein also indicated with the more general term solid state lighting devices or solid state light sources. Hence, in embodiments the electronic component comprises an active electronic component. Especially, the electronic component comprises a solid state light source. Other examples of active electronic components may include power sources, such as a battery, a piezoelectric device, an integrated circuit (IC), and a transistor. In yet other embodiments, the electronic component may include a passive electronic component. Components incapable of controlling current by means of another electrical signal are called passive devices. Resistors, capacitors, inductors, transformers, etc. can be considered passive devices.

In an embodiment, the electronic component may include an RFID (Radio-frequency identification) chip. A RFID chip may be passive or active.

Especially, the electronic component may include one or more of a solid state light source (such as a LED), a RFID chip, and an IC.

The term "electronic component" may also refer to a plurality of alike or a plurality of different electronic components.

The electronic component may be provided with or without electrical wiring (see further also below).

A 3D printer for performing the method according to the invention is configured to assemble the electronic component comprising filament. This (assembly) will be executed upstream of the nozzle, such as in the printer head (including a liquefier) or even upstream of the printer head.

In an embodiment, the filament comprises a cavity for hosting the electronic component, and the method further comprises the step of arranging the electronic component in the cavity upstream of the printer nozzle. The filament with cavity may be provided as such. A 3D printer for performing such a method may include a device configured to provide indentations in the filament (upstream of the nozzle; but in general downstream of a filament roll).

In another embodiments, which may of course also be combined with the former embodiment(s), the electronic component may be pressed into the filament, optionally in combination with a local heating of the filament where the electronic component is to be received. Hence, the method may further comprise the step of pressing the electronic component in the filament upstream of the printer nozzle. As indicated above, this may especially further include, prior to (the) pressing (of) the electronic component in the filament, locally heating the filament at a position where the electronic component is to be arranged. Therefore, prior to pressing the electronic component in the filament the filament may be locally heated at a position where the electronic component is to be arranged. To this end, a 3D printer for performing the method according to the invention, especially an electronic component providing device comprised by the 3D printer, may include a heater. The heater is configured to (locally) provide heat to the filament. Thereby, the filament is locally softened, which may allow pressing the electronic component in the filament.

The electronic component may be pressed in the filament, with some recess relative to the filament surface.

Prior to the implementation of the electronic component in the filament, the electronic component may be provided with electrically conductive wires ("wiring" or "electrical wiring"), see also below. However, optionally the electronic connection may be applied afterwards. Hence, in embodiments the method may further comprise electrically connecting the electronic component with an electrical conductor (after 3D printing (the 3D printable material)). For instance, part of an electrical conductor can be pressed in the 3D printed item (under construction). Even, the 3D printed item (under construction) may be printed such as to allow introduction of an electrical conductor and to functionally contact such electrical conductor with the electronic components. In yet further embodiments, the electronic connection may be executed wireless, such as when using a (passive) RFID chip.

As already indicated above, the printable material may already include the electrical wire connection with the electronic component. Hence, the 3D printable material may comprise said electronic component and one or more electrical conductors for functionally coupling the electronic component with a source of electrical energy (with said one or more electrical conductors functionally coupled with the electronic component). Here, the terms "electrical conductors" or "wiring" or "electrical wiring" or "electrical wires" especially (at least) refer to the wires or cables that are used to transport electricity, i.e. "copper". The wires may be insulated or non-insulated. The latter embodiment may also be applied as the polymeric material may be electrically insulating.

A chain of electrically connected solid state light sources may be applied, which may be embedded in the printable material. Hence, a plurality of solid state light sources electrically connected in series or parallel with electrical conductors may be comprised by a filament of 3D printable material, with especially the electrical conductors configured parallel to a longitudinal axis (A) of the filament. Hence, the plurality of electrically connected solid state light sources may extend of tens of centimeters of even meters within the filament.

A 3D printer for performing the method of the invention may be configured to assemble the electronic component with wiring comprising filament. This will be executed upstream of the nozzle, such as in the printer head (including a liquefier) or even upstream of the printer head. Therefore, the method may comprise providing said (a) plurality of solid state light sources electrically connected in series or parallel with said electrical conductors and (b) a filament, and the method may further comprise combining said solid state light sources electrically connected in series or parallel with said electrical conductors and said filament upstream of the printer nozzle to provide downstream of said printer nozzle printable material comprising said plurality of solid state light sources electrically connected in series or parallel with said electrical conductors.

When printing, some extrusion may take place in the printer head. In view of the present invention this extrusion function may—in embodiments—be reduced or may even be absent. Alternatively or additionally, to cope with extrusion effects the electrical wiring may include elastic units that allow for a stretching of the filament (and the electrical wiring). Therefore, in embodiments one or more electrical conductors provided to the fused deposition modeling (FDM) 3D printer have a spring-like segment allowing at least an elongation parallel to a length (axis) of the one or more electrical conductors.

A 3D printer configured to execute the herein described method comprises (a) a first printer head comprising a printer nozzle, (b) a filament providing device configured to provide a filament to the first printer head, and optionally (c) an electronic component providing device configured to provide an electronic component to the filament or to the first printer head. The filament providing device may include one or more filament rollers or acceptors for one or more filament rollers. The filaments on the rollers may already include the electronic component and optionally such electronic component including an electrical connection (wire(s)). The term "3D printer" may also refer to a 3D printer system.

The filament or printable material including the electronic component, or including such electronic component including an electrical connection (wire(s)), may be assembled in the 3D printer. Therefore, in embodiments the 3D printer may include an electronic component providing device configured to provide an electronic component to the filament or to the first printer head.

Especially in case where the electronic component does not include electrical wiring, the electronic component providing device may be configured to provide an electronic component to the filament, such as by pressing and/or integrating in cavities in the filament. Especially in the case where the electronic component also includes electrical wiring, the electronic component providing device may be configured to provide the electronic component (functionally coupled with electrical wiring) to the first printer head. In the printer head, the printable material including the electronic component (functionally coupled with electrical wiring) may be assembled, whereby the printable material downstream of the nozzle (thus) comprises the printable material including the electronic component (functionally coupled with electrical wiring).

In some instance, orientation of the electrical component in the 3D item may be important. Hence, the method may also include and/or the apparatus may also include measures for orienting the electronic components. For instance, in embodiments the fused deposition modeling (FDM) 3D printer has a non-circular printer nozzle. For instance, in the case of electronic components having an aspect ratio differing from 1 this may assist in orienting the electronic device. For instance, assuming an oval nozzle opening and a plate like electronic component, such nozzle opening may assisting in orienting the plane of the plate like electronic component parallel to the long axis of the oval. Alternatively or additionally, in embodiments at least part of the first printer head (comprising said printer nozzle) is at least partly rotatable along an axis perpendicular to a plane of a nozzle opening of the printer nozzle. For instance, the entire printer head may be rotatable (relative to the 3D printer).

It may be desirable to print the electronic components e.g. at least partly independent of the bulk of the 3D printed material. To this end, the 3D printer may include more than one printer head. Hence, in embodiments the 3D printer further comprises a second printer head configured to 3D print printable material not comprising an electronic component.

A 3D printed item obtainable with the herein described method and/or produced with a 3D printer configured to execute the herein described method comprises (a) 3D printed material, an electronic component embedded in said 3D printed material, and optionally (c) an electrical conductor embedded in the 3D printed material and functionally coupled to said electronic component, wherein in specific embodiments the electrical conductor has a spring-like segment. A device may comprise such 3D printed item or it may comprise a plurality of such 3D printed items, which may optionally also functionally be coupled. The electrical conductor embedded in the 3D printed material may also partly protrude from the 3D printed material, such as for an electrical connection with an electrical component or source of electrical energy external from the 3D printed material (i.e. external from the 3D printed item)

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
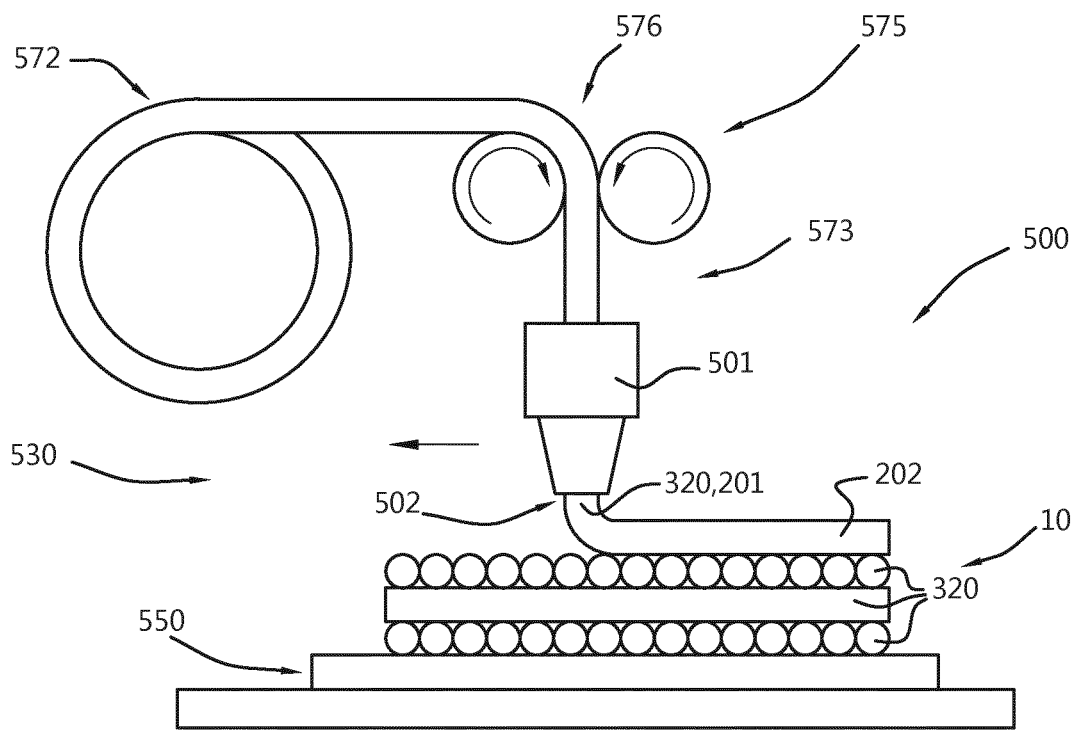
FIGS. 1a-1c schematically depict some general aspects of a 3D printer.

FIG. 1a schematically depicts some aspects of a 3D printer configured to execute the herein described method. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320. Arranging filament by filament and filament on filament, a 3D item 10 may be formed. Reference 575 indicates the filament providing device, which here amongst others include the spool or roller and the driver wheels, indicated with reference 576.

Figure 1B:
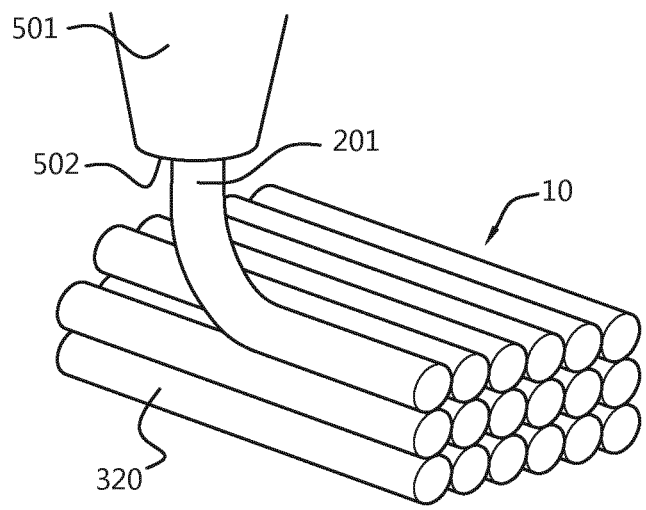

FIG. 1*b* schematically depicts in 3D in more detail the printing of the 3D item 10 under construction. Here, in this schematic drawing the ends of the filaments 320 in a single plane are not interconnect, though in reality this may in embodiments be the case.

Figure 1C:
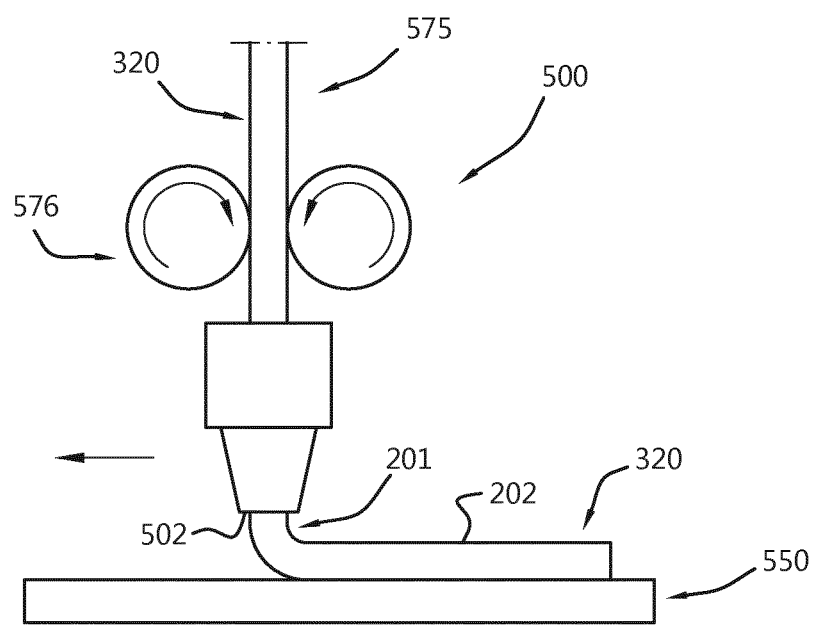

FIG. 1*c* schematically depict some further aspects in more detail.

Below, especially LEDs as examples of electronic components 40 are given. However, unless indicated otherwise or clear from the description for a person skilled in the art, instead of a LED also another electronic component may be applied.

Figure 2A:
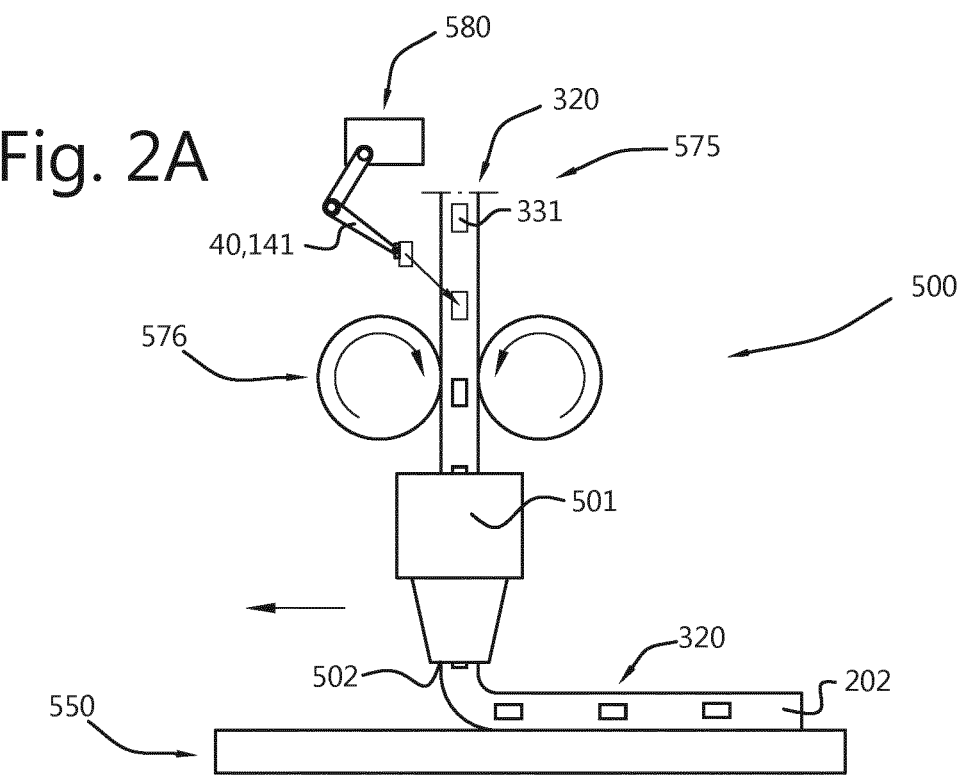
FIGS. 2a-2i schematically depict various aspects of the method and/or a 3D printer.
Figure 2B:
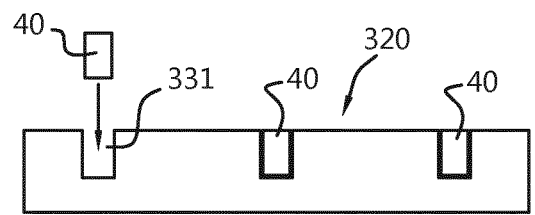

Here, filaments for FDM printers are proposed containing discrete elements such as LEDs. Amongst others, it is suggested using a pre-configured filament with inclusions where the (objects such as) LEDs can be placed (FIG. 2*a*). In FIGS. 2*a* and 2*b* it is shown that e.g. the LEDs may be inserted in the inclusion of the filament using pick-an-place equipment (example of an electronic component providing device). The filament 320 comprises cavities 331 for hosting the electronic component 40. The electronic components 40 are arranged in the cavities 331 upstream of the printer nozzle 502. Reference 141 indicates a solid state light source as an example of an electronic component 40. Reference 580 schematically indicates an electronic component providing device, such as a robot arm, which can be used to insert the components 40 in the filament 320. In embodiments, the cavities 331 may be larger, such as deeper, than the components 40.

Figure 2C:
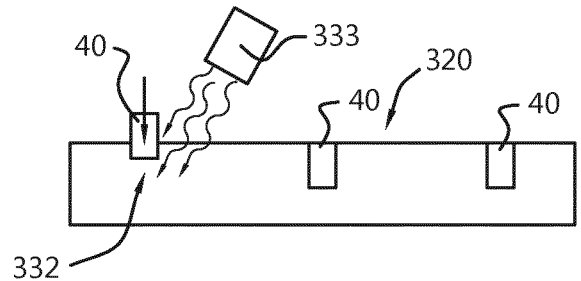

The LEDs may also be inserted in the filament by pressing the LED in the filament (FIG. 2*c*). In a preferred embodiment the filament and/or LED is locally heated such that it becomes easier to press the LED into the filament 320. Prior to pressing the electronic component 40 in the filament 320, the filament 320 may be locally heated at a position 332 where the electronic component 40 is to be arranged. Schematically, a heater 333 is depicted.

In order to do this, the software which drives the printer to produce 3D objects can be used to generate instructions for configuring the filament to place the object at the desired position.

Figure 2D:
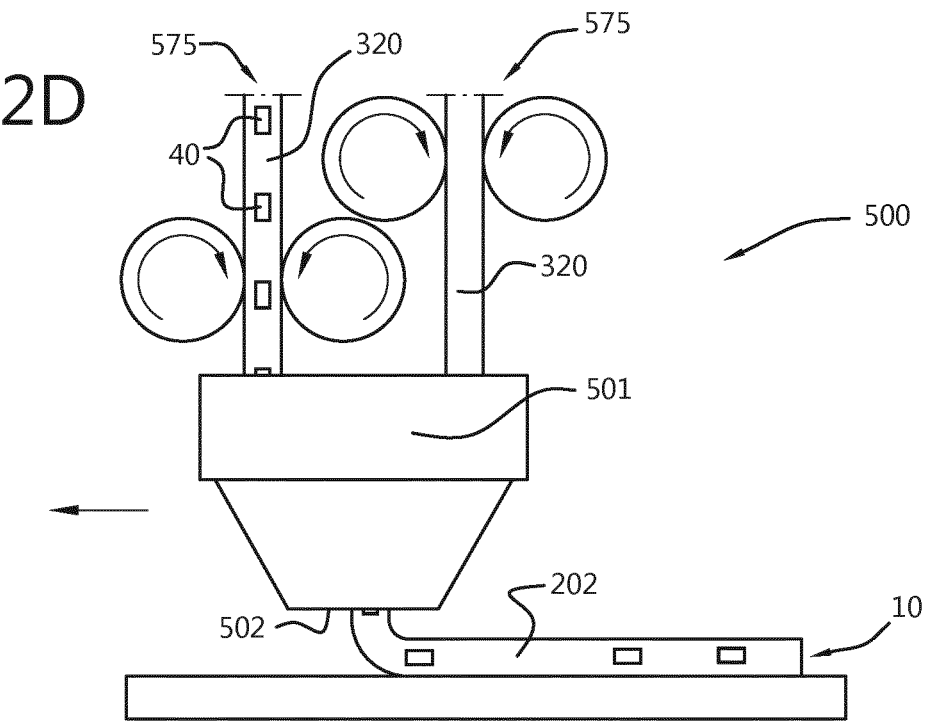

In another configuration, a printer head 501 (or liquefier) is suggested which can accept a first thermoplastic filament and a second thermoplastic filament. The first thermoplastic filament comprises inclusions which may comprise the (objects such as) LEDs. The second thermoplastic filament comprises no inclusions and thus comprises no (objects such as) LEDs. By controlling the speed at which the filaments are pushed into the liquefier, the (objects such as) LEDs can be placed at the desired positions in the 3D printed structures (FIG. 2*d*). Of course, the 3D printer 500 may also accept a first thermoplastic filament which comprises first LEDs, and a second thermoplastic filament comprising second LEDs. The LEDs may be positioned at different pitches; the LEDs in the different filaments may be the same or may be different, etc.

In yet another embodiment, a 3D printer is suggested comprising more than one printing head such as two printing heads (see further also below). The first printing head may print LEDs in a thermoplastic material, the second head may print only a thermoplastic material. The thermoplastic materials for the two or more printing heads may in embodiments be the same material.

In yet another embodiment, the 3D printer may comprise at least a first and a second printing head (see also below). The first printing head comprises a first filament with LEDs, and the second printing head comprises a second filament with LEDs. The first and second filament may in embodiments be of the same thermoplastic material, but the LEDs and/or LED pitch may be different.

Different types of LEDs may be used in the filament e.g. LEDs which emit light at different wavelengths. The LEDs may be positioned close to the surface of the filament or the LEDs may be positioned closer to the core of the filament. The LEDs may be positioned in an inclusion or cavity inside the filament (see also above).

In embodiments, the filament may consist of parts which can be e.g. clicked together. In this way, a row of parts may be provided, which form the filament. Each part may close a cavity of another part.

The LEDs may be oriented parallel to the length of the filament. However, the LEDs may also be oriented perpendicular to the length of the filament. In yet other embodiments, the LEDs may be positioned under an angle, such as between 10-80°, with respect to the length of the filament. Here, the arrangmenet refers to the light emitting surface of the LEDs. Here, especially LEDs without domes may be applied. However, also LEDs with domes may be applied.

It may also be possible to improve controlling the orientation of the LED during printing. Empty inclusions may be filled with a filling material. The filling material is preferably made from the same material as the filament. Empty inclusions may be filled with a filling element. The filling element may be made of a material made from the same material as the filament. The filling material or filler elements may also be added on top of the LED in the inclusion. The inclusions may be shaped such that the (object such as an) LED is clamped into the filament.

The pick-and-place machine or device, herein also indicated as electronic component providing device 580, may in embodiments be able to select different LEDs e.g. from different reels or rollers (not depicted).

The electronic component may be an electronic device such as a battery, a photovoltaic cell, a sensor or any other small electronic element. Also other elements may (additionally be included, such as a luminescent material comprising element, an optical material, or element such as a scattering, diffractive, refractive or reflective optical material or element.

The filament itself may also comprise a phosphor material such as inorganic phosphors, such as YAG:Ce or LuAG:Ce luminescent material particles. The filament may also comprise organic phosphors and/or quantum dots. The filament itself may also comprise a scattering material such as $TiO_2$, $Al_2O_3$ and/or $BaSO_4$ particles.

Figure 2E:
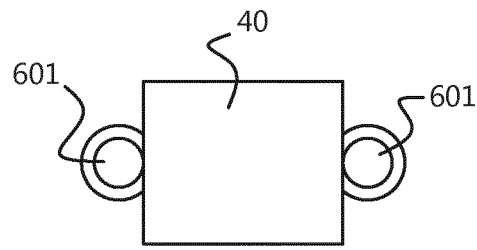
Figure 2F:
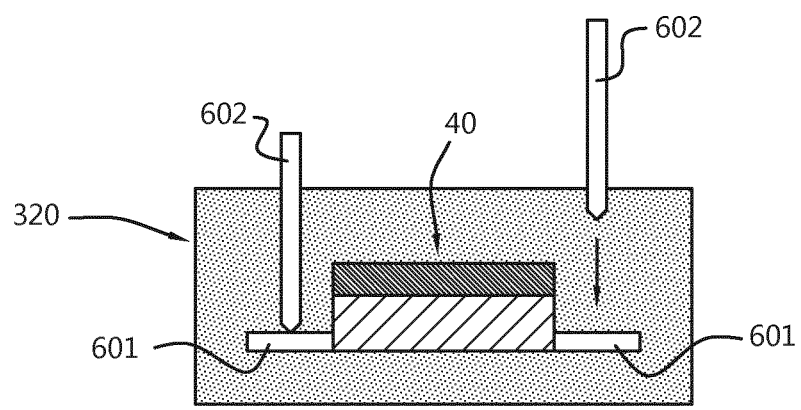
Figure 2G:
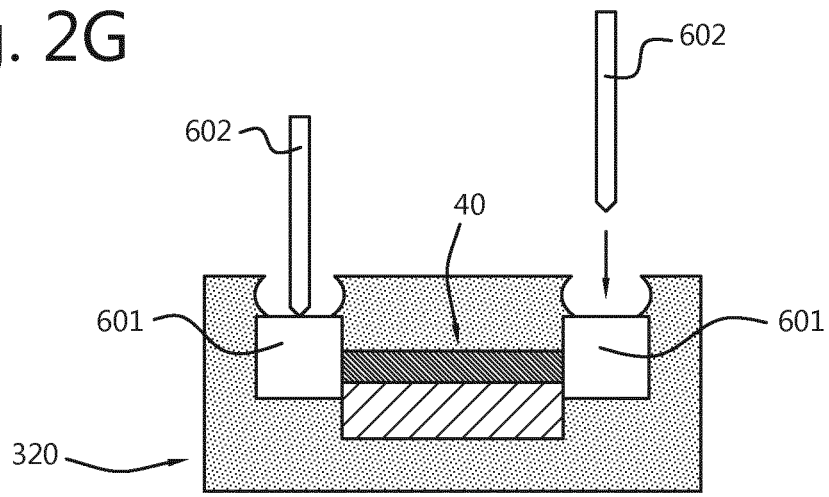

The electronic component may include electrically contacting elements 601. With such meant an electrical wayer may be contacted. The electrically contacting element 601 may be designed such that the electronic component can be easily contacted after printing (FIG. 2e). For example, after 3D printing (sharp) electrically conductive pins 602 may be used to connect the electrically contacting elements of the electronic component. For example, after 3D printing some material may be removed by e.g. locally exposing the 3D printed structure to heat and subsequently connect the electrically contacting elements of the electronic component via wires or electrically conductive pins 602 (FIG. 2f).

Figure 2H:
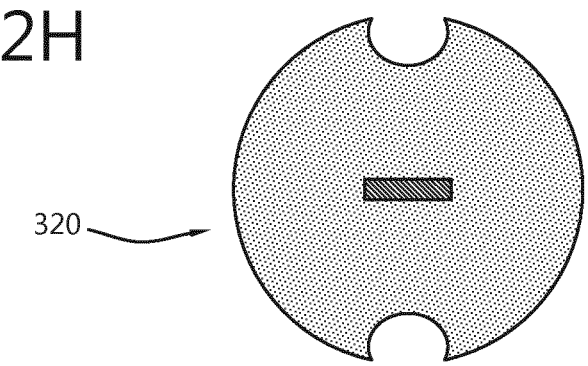
Figure 2I:
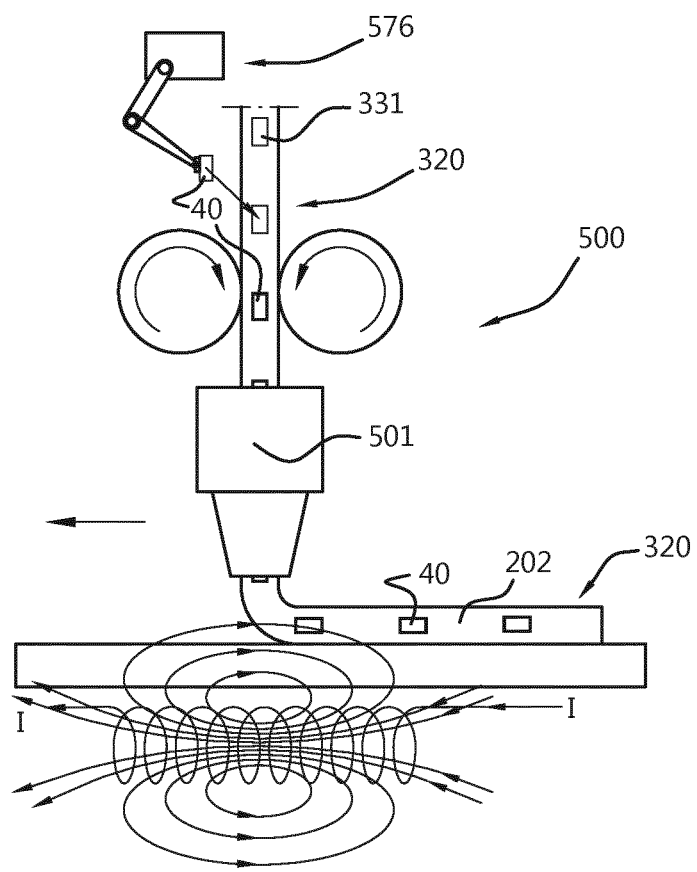

The electronic component may be oriented via an orientation means. For example, the filament 320 may be designed such that it can be oriented during printing (FIG. 2h). For example, the filament 320 may comprise an orientation means such as a notch. The notch may be used such that the filament stays oriented in the printer. The electronic component 40 may also be oriented via an external means such as (a device configured to generate) a magnetic field (FIG. 2i).

Figure 3A:
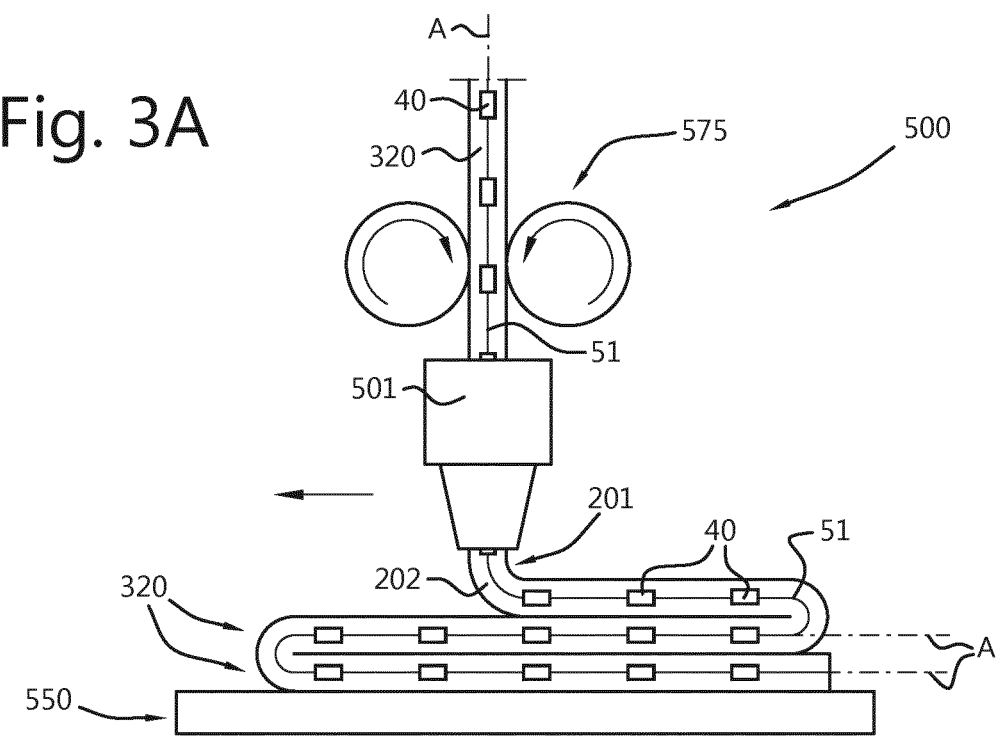
FIGS. 3a-3i schematically depict various aspects of the method and/or a 3D printer.

It may further be desirable to be able to make a filament 320 which contains wired electronic components, such as wired LEDs, incorporated in therein, which can be printed using FDM printers (FIG. 3a). Reference A indicates a longitudinal axis.

Herein, various configurations, measures and materials which can enable 3D printing wired (i.e. connected) LEDs embedded in a polymer while preventing issues such as breaking of contacts during printing are provided.

Figure 3B:
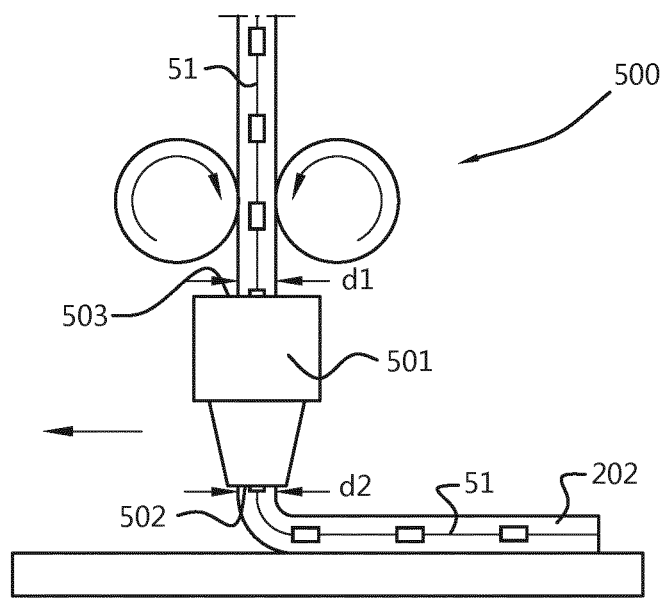

In an embodiment, it is suggested that the diameter d1 of the inlet 503 of the liquefier or printer head 501 is substantially the same as the diameter d2 of the nozzle inlet 502 (FIG. 3b). E.g. d1=d2+/−(⅒ *d1).

Figure 3C:
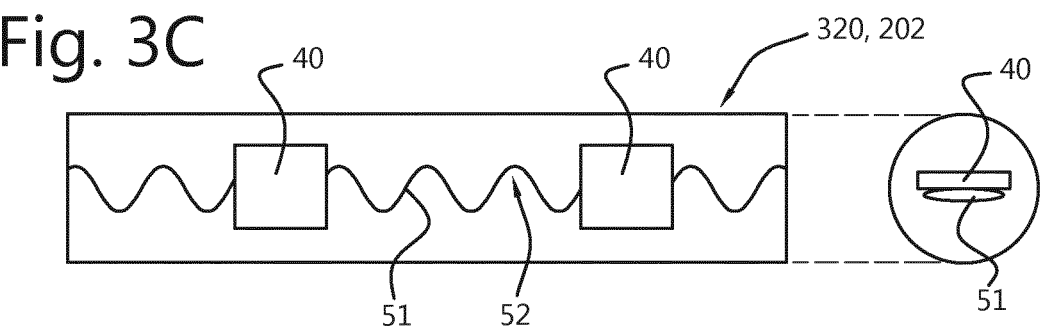

In another embodiment, the wires connecting the LEDs are shaped such that it allows for flexibility (FIG. 3c). For instance, (electrically conductive) spring-like elements 52 may be provided. In embodiments, the wires 52 connecting the LEDs are protected with a coating. In yet another embodiments, multiple (conductive) wires may be used. Thermoplastic materials which can be used include but are not limited to thermoplastics ABS, ABSi, polyphenylsulfone (PPSF), polycarbonate (PC), and Ultem 9085. In yet another embodiment the filament is shaped such that it is more likely to prevent issues such as breaking of contacts during printing. FIG. 3c may schematically refer to the filament 320 before printing or the filament after printing, i.e. the printed 3D material 202.

Figure 3D:
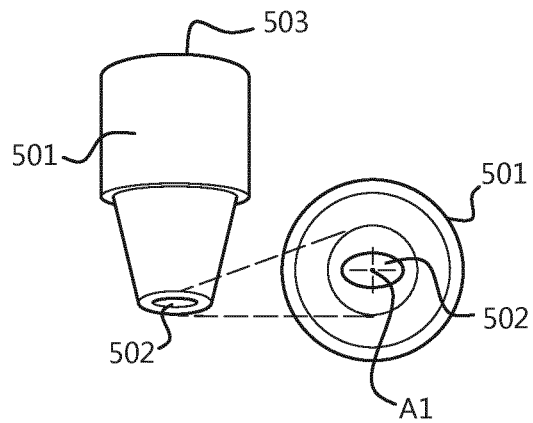

In embodiments, the nozzle 502 of the printer head may have a non-circular shape, such as rectangular or oval, etc., see also FIG. 3d. Reference A1 indicates an axis, about which the printer head may be rotatable. This rotatability may apply to printer heads having a circular or non-circular shaped nozzle.

Figure 3E:
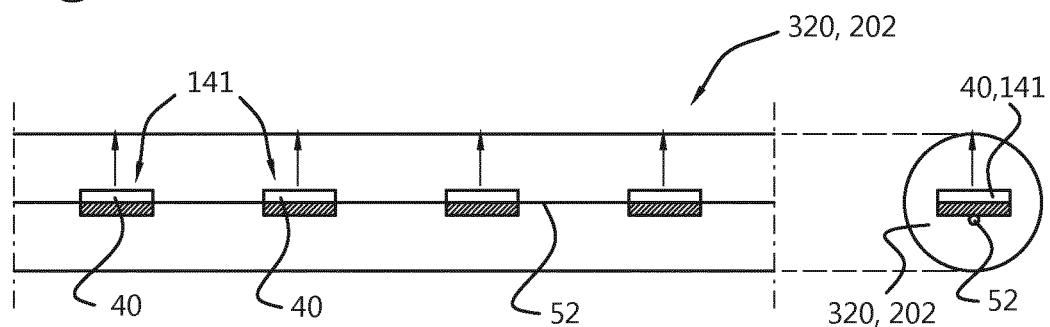

In embodiments, the LEDs may have a preferred orientation. Such orientation can be obtained by using a shaped wire in which the LEDs are oriented according to the shape (FIG. 3e). FIG. 3e may schematically refer to the filament 320 before printing or the filament after printing, i.e. the printed 3D material 202.

Figure 3F:
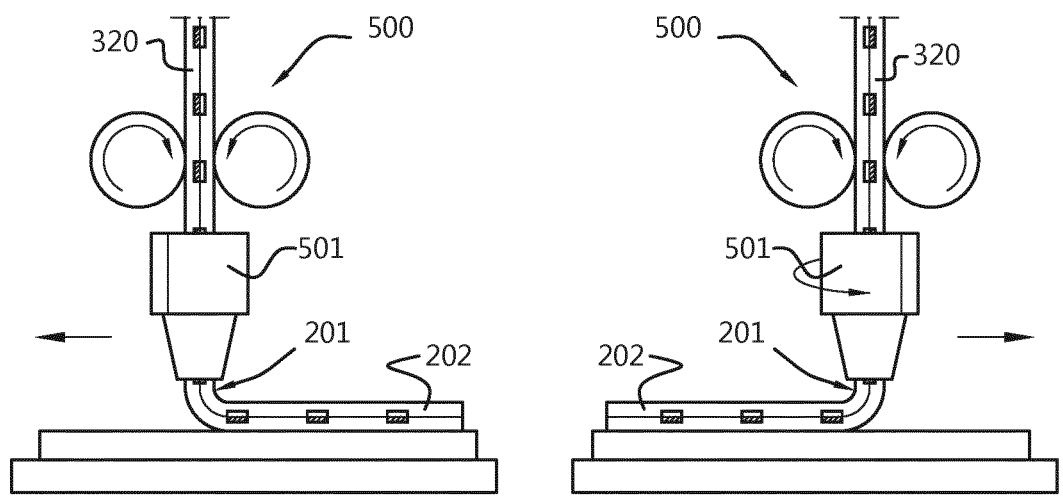
Figure 3G:
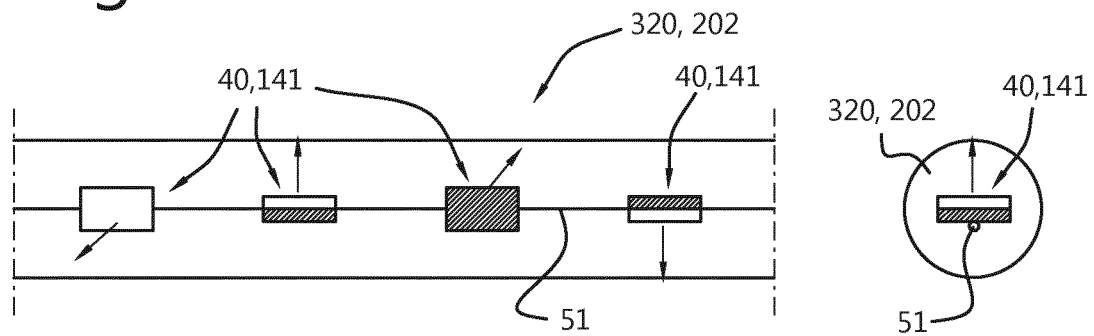

In embodiments, the nozzle may be turned into different directions in order to print the LEDs in the same direction on the substrate (FIG. 3f). The LEDs may also be oriented in under various angles for obtaining homogeneous illumination from the printed structure (FIG. 3g). FIG. 3g may schematically refer to the filament 320 before printing or the filament after printing, i.e. the printed 3D material 202. In embodiments, the LEDs may emit different colors. To this end, the 3D printer 500 may include a rotatable printer head 501.

The polymeric material may comprise light reflecting materials such as silver or aluminium flakes. The polymeric material may comprise light conversion (i.e. luminescent) materials such as YAG:Ce or LuAG:Ce particles.

The filament with wired LEDs may contain different sections (S) of different (3D printable or 3D printed) materials with different properties. For example, the sections positioned at the LEDs may comprise a material with a higher transmission compared to the other sections. For example, the first sections may comprise no scattering particles, while the second sections comprise scattering particles. The different sections are indicate with references S1 and S2.

Figure 3H:
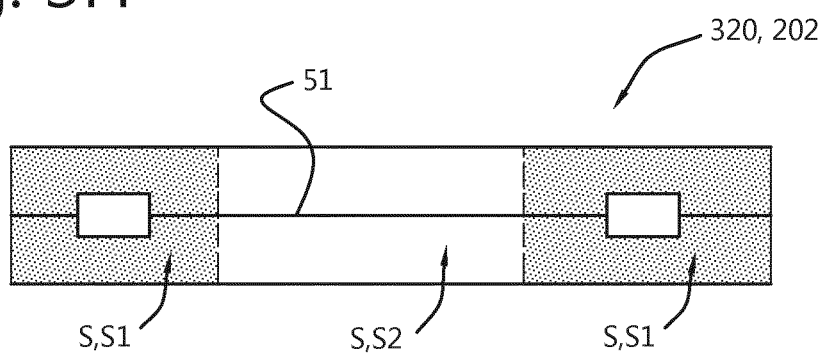

In another example, the sections positioned at the LEDs may comprise a material with a higher luminescent concentration compared to the other sections (FIG. 3h). For example, the first sections may comprise phosphor particles, while the second sections comprise no phosphor particles. FIG. 3h may schematically refer to the filament 320 before printing or the filament after printing, i.e. the printed 3D material 202.

Figure 3I:
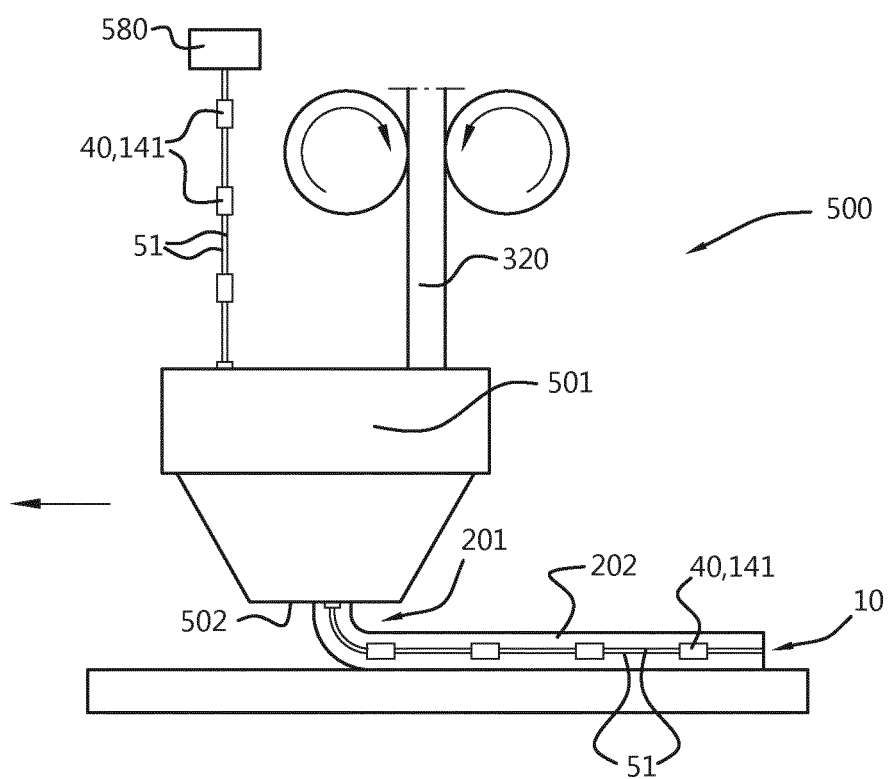

FIG. 3i schematically depicts the combination of with electrical wires 51 connected electrical components 40 which are combined with a filament 320 in the printer head 501 and provided as printable material 201 downstream of the nozzle 501. Here, the electronic component providing device 500 provides electronic components that are electrically connected via electrical wires 51.

Figure 4:
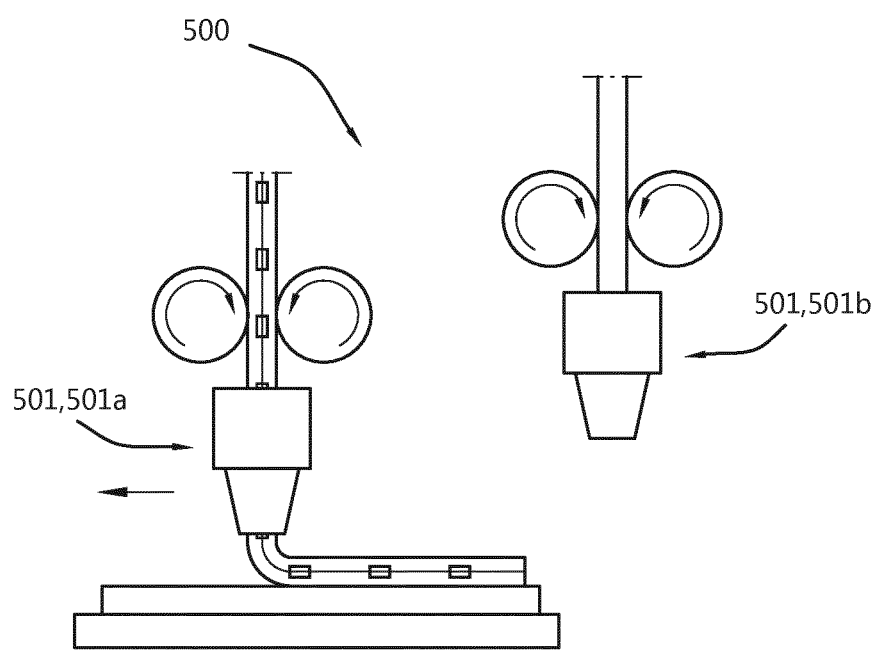
FIG. 4 schematically depicts a 3D printer.

As indicated above, the 3D printer may have 2 printing heads. One for printing wired LEDs, one for printing a polymeric material without any wired LEDs. This is schematically depicted in FIG. 4.

In this way, it is possible to print a 3D structure consisting of sections comprising a filament with wired LEDs and sections comprising no filament with wired LEDs. It may also possible to print a 3D structure with multiple filament with wired LEDs, etc.

The term "substantially" herein, such as in "substantially consists", will be understood by the person skilled in the art. The term "substantially" may also include embodiments with "entirely", "completely", "all", etc. Hence, in embodiments the adjective substantially may also be removed.

Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method for manufacturing a 3D item comprising an electronic component, the method comprises the step of printing with a fused deposition modeling (FDM) 3D printer a 3D printable material to provide said 3D item, wherein the 3D printable material comprises said electronic component, wherein the fused deposition modeling (FDM) 3D printer comprises a printer nozzle, wherein the method further comprises the steps of providing upstream of the printer nozzle a filament of 3D printable material, and creating upstream of the printer nozzle an assembly of the filament and the electronic component, wherein the electronic component comprises an active electronic component or a solid state light source.

2. The method according to claim 1, wherein the filament comprises a cavity for hosting the electronic component, and wherein the method further comprises the step of arranging the electronic component in the cavity upstream of the printer nozzle.

3. The method according to claim 1, wherein the method further comprises the step of pressing the electronic component in the filament upstream of the printer nozzle, and wherein prior to pressing the electronic component in the filament the filament is locally heated at a position where the electronic component is to be arranged.

4. The method according to claim 1, further comprising electrically connecting the electronic component with an electrical conductor.

5. A method for manufacturing a 3D item comprising an electronic component, the method comprises the step of printing with a fused deposition modeling (FDM) 3D printer a 3D printable material to provide said 3D item, wherein the 3D printable material comprises said electronic component, wherein the fused deposition modeling (FDM) 3D printer comprises a printer nozzle, wherein the method further comprises the steps of providing upstream of the printer nozzle a filament of 3D printable material, and creating upstream of the printer nozzle an assembly of the filament and the electronic component, wherein the wherein the 3D printable material comprises said electronic component and one or more electrical conductors for functionally coupling the electronic component with a source of electrical energy.

6. The method according to claim 5, wherein a plurality of solid state light sources electrically connected in series or parallel with electrical conductors are comprised by a filament of 3D printable material, with the electrical conductors configured parallel to a longitudinal axis (A) of the filament.

7. The method according to claim 6, wherein the fused deposition modeling (FDM) 3D printer comprises a printer nozzle, wherein the method comprises providing said (a) plurality of solid state light sources electrically connected in series or parallel with said electrical conductors and (b) a filament, and wherein the method comprises combining said solid state light sources electrically connected in series or parallel with said electrical conductors and said filament upstream of the printer nozzle to provide downstream of said printer nozzle printable material comprising said plurality of solid state light sources electrically connected in series or parallel with said electrical conductors.

8. The method according to claim 5, wherein one or more electrical conductors provided to the fused deposition modeling (FDM) 3D printer have a segment allowing at least an elongation parallel to a length of the one or more electrical conductors.

* * * * *